United States Patent [19]

Urry

[11] Patent Number: 5,389,457
[45] Date of Patent: Feb. 14, 1995

[54] GAS FILLED COLLAPSIBLE MEMBER WITHIN ANODE TO ACCOMMODATE EXPANSION OF ANODE

[75] Inventor: Lewis F. Urry, Elyria, Ohio

[73] Assignee: Eveready Battery Company, Inc., St. Louis, Mo.

[21] Appl. No.: 103,377

[22] Filed: Aug. 9, 1993

[51] Int. Cl.⁶ .................................. H01M 2/26
[52] U.S. Cl. ........................ 429/66; 429/161; 429/165
[58] Field of Search ................. 429/66, 161, 165

[56] References Cited

U.S. PATENT DOCUMENTS

| | | | |
|---|---|---|---|
| 2,920,475 | 11/1975 | Nabiullin et al. | 136/86 |
| 3,069,485 | 12/1962 | Winger | 136/6 |
| 3,156,585 | 11/1964 | Yamano et al. | 136/6 |
| 3,355,329 | 11/1967 | Wilke et al. | 429/165 X |
| 4,054,726 | 10/1977 | Sauer et al. | 429/66 |
| 4,211,830 | 7/1980 | Chevet | 429/66 X |
| 4,303,743 | 12/1981 | Réau | 429/66 X |
| 4,560,626 | 12/1985 | Joy | 429/66 X |
| 4,726,779 | 2/1988 | Costenoble et al. | 429/133 |

FOREIGN PATENT DOCUMENTS

| | | | |
|---|---|---|---|
| 55-133761 | 10/1980 | Japan | 429/66 |
| 290432 | 8/1953 | Switzerland | 429/66 |

*Primary Examiner*—Stephen Kalafut
*Attorney, Agent, or Firm*—Robert W. Welsh

[57] ABSTRACT

A galvanic cell, such as an alkaline cell employing an anode that expands during discharge, such as a zinc electrode, in which a gas filled collapsible member is disposed within the anode to accommodate any expansion of the anode during discharge or during storage.

18 Claims, 2 Drawing Sheets

GAS FILLED COLLAPSIBLE MEMBER WITHIN ANODE TO ACCOMMODATE EXPANSION OF ANODE

FIELD OF THE INVENTION

The invention relates to a galvanic cell, such as an aqueous alkaline cell, in which a gas filled collapsible member is disposed within the anode and adapted to accommodate expansion of the anode during discharge.

BACKGROUND OF THE INVENTION

Alkaline cells are well known in the art and generally employ a zinc anode, manganese dioxide as the cathode with an aqueous solution of potassium hydroxide for the electrolyte. These cells are readily available commercially for industrial and home applications. Recently a new type of alkaline cell was disclosed by Cegasa International, a Spanish company. This cell, referred to as an air-assisted cell, employs zinc as the anode and manganese dioxide as the cathode with an aqueous solution of potassium hydroxide as the electrolyte. This cell is designed so that the positive electrode containing the manganese dioxide ($MnO_2$) is supported about its periphery and along its full length in the cell by a perforated ribbed air distribution grid. The bottom or negative end of the cell has an insulating support which allows air to enter the cell and pass up along the outside of the supported positive electrode. When the cell is initially put into a circuit, the electrochemical reaction depends primarily upon the presence of the manganese dioxide cathode. As the reaction progresses, and the manganese dioxide cathode is electrochemically reduced, air within the cell reoxidizes and recharges the manganese dioxide. Thus an air-assisted cell is designed to use oxygen in the air to "recharge" manganese dioxide in the cathode. This "recharging" of the manganese dioxide means that the fixed quantity of manganese dioxide in the cathode can be discharged and then recharged numerous times.

Standard alkaline batteries and air-assisted alkaline batteries have traditionally been made with mercury in the anode. Mercury helped to prevent gassing by raising the hydrogen overvoltage. Due to concerns about the environment, battery manufacturers are designing alkaline batteries with little or no mercury. As the percentage of mercury in the cells has been reduced, problems with leakage and decreased shelf life have become apparent. The reduction or elimination of mercury has led to service and shelf storage problems because gassing in and the expansion of the anode in the anode compartment have forced electrolyte to flow from the anode compartment into the cathode compartment. As electrolyte moves from the anode into the cathode, ionic conductivity in the anode decreases and the cell cannot discharge efficiently. If the anode compartment continues to gas and expand, the electrolyte from the anode could be driven into the cathode and may essentially be driven through the seal and out of the cell. In addition, the reaction products of certain alkaline cells take up a greater volume than the initial components and thus could further create pressure buildup within the cell. To compensate for anode expansion, a void cavity has been provided above the anode compartment to accommodate anode expansion and gassing. This solution, although somewhat effective, reduces the amount of active anode material assembled in the cell and thus reduces the cell output capacity.

U.S. Pat. No. 4,726,779 disclosed a galvanic primary cell in which the anode mixture of a zinc-alkaline electrolyte gel is displaced by the introduction of a hollow body into the concentrically arranged anode space so that the zinc powder is fixed in a layer oriented toward the cathode of the cell, ensuring proper discharge, and so that the aqueous portion of the anode mixture can escape inside the displacement body through narrow openings in the body's wall. By attaching the displacement body to the negative electrode conductor, the current drainage can be improved by making at least part of the displacement body of a metallically conducting material.

U.S. Pat. No. 3,069,485 disclosed a cell comprising a cupped metallic container, an inner and an outer metal bottom, a separator-lined cathode fitting in said container, a top closure, a tubular semi-rigid swellable anode fitting in said cathode but separated therefrom by said separator and an inert tubular metallic conductor fitting in contact with said anode, said conductor being composed of a material which is unaffected by the electrochemical reactions in said cell, and being secured to said inner metal bottom by means of a rivet also contacting said outer metal bottom and an insulating grommet surrounding said rivet and insulating said rivet and said collector from said inner bottom.

U.S. Pat. No. 3,156,585 discloses a hermetically sealed battery in which the innermost electrode is also a hollow cylinder composed of a plurality of part-cylindrical elements, with a perforated resilient sleeve fitting in the central bore, and there is provided a space in the center of the battery which functions as a diffusion space. The resilient sleeve can readily be inserted into the central bore by merely contracting the sleeve radially, and the sleeve tends to expand within the bore by its own resiliency to establish positive pressure contact of the same with the innermost or central electrode of the cell as well as between the electrodes and separators. The connection of the central electrode to the corresponding terminal is also effected in a simple and positive manner by the mere pressure fit of the resilient sleeve into a central recess formed in a cover plate.

U.S. Pat. No. 4,054,726 discloses a zinc-air alkaline primary cell which includes a metal cover containing a negative zinc electrode and a metal cup containing a positive air electrode. The cover is sealed to the cup which has an air inlet by means of a gasket. Zinc active material of the zinc electrode may be in the form of a compressible body or may comprise zinc powder in which a compressible body is embedded, so as to provide space to compensate for expansion of the zinc active material during use of the cell.

U.S. Pat. No. 3,920,475 discloses an alkaline galvanic cell in which free access of air oxygen to the positive electrode along the height and cross-section of the electrode as well as for hydrogen escape from the negative electrode is provided by having axial extending passages made in the body of the positive electrode, said passages preferably being of arcuate shape in a cross-section and the body of the negative electrode is also provided with axially extending passages.

It is an object of the present invention to provide a galvanic cell with a gas filled collapsible member within the anode compartment to accommodate expansion of the anode during shelf storage and/or discharge.

It is another object of the present invention to provide a galvanic cell with improved capacity while maintaining good service and shelf performance.

It is another object of the present invention to provide means to retain the anode's electrolyte within the confines of a separator encasing the anode.

It is another object of the present invention to provide an efficient and cost effective alkaline cell.

The above and further objects will become apparent upon consideration of the following description and drawings thereof.

SUMMARY OF THE INVENTION

The invention relates to a galvanic cell comprising a conductive container; a cathode electrode in electronic contact with the container and said container functioning as the first terminal of the cell; a separator disposed within said cathode electrode to form a cavity within said cathode electrode, said separator permitting ion transport; an anode electrode disposed within said cavity and electronically insulated from the cathode electrode by said separator; an anode current collector in electronic contact with said anode electrode and in electronic contact to an external terminal of the cell in which said external terminal functions as the second terminal of the cell; and said anode current collector comprises a gas filled collapsible member disposed within said anode electrode and having an opening into a confined space in the cell and said gas filled collapsible member adapted to accommodate expansion of the anode electrode.

The collapsible member could be an integral part of the anode current collector. Preferably, the collapsible member would be an integral part of the anode current collector member which as used herein shall mean at least partially secured to the anode current collector member or in physical contact with the anode current collector member or could be a conductive member which also functions as the anode current collector. In the latter embodiment, the collapsible member would be an electronic conductive member or have at least a portion of its outer surface coated with an electronic conductive material. In all embodiments, it is preferable to have the outer surface of the collapsible made with a material that is non-wettable by the electrolyte so that the flow of gas from the anode can move along the outer surface to an appropriate place in the cell for venting, for example, through the seal, if appropriate. By accommodating expansion of the anode with the collapsing of the collapsible member, the electrolyte will be maintained in the anode compartment and be prevented from blocking the gas vent path through the seal. By locating the collapsible member within the anode, it is in position for accommodating any expansion of the anode with the least resistance. Preferably, the collapsible member could have longitudinal ridges to add strength to the member so that it could be easily projected into the anode and then with the longitudinal ridges, the member could be easily collapsed upon expansion of the anode.

Generally, a void space is provided above the anode electrode to accommodate expansion of anode and provide a space for the gas given off by the anode. The expansion of the anode is not only from the formation of gas but also due to volume increase of the reaction products over the volume occupied by the original materials of the anode. In the preferred embodiments of this invention, the gas filled collapsible member has an opening into a confined space in the cell, such as a space above the anode electrode. Since the space above the anode electrode is no longer the sole space for accommodating expansion of the anode, then in the embodiments of this invention, the space above the anode could be greatly reduced and in some applications, the anode could extend up to at least 80% or more of the height of the separator. In these embodiments, the output capacity of the cell could be increased.

The gas for the collapsible member could be any gas that is harmless to the cell system such as air, nitrogen and the like. The material for the collapsible member could be a plastic such as polystyrene, polypropylene or polyethylene. If a conductive coating is placed on the collapsible member then the coating could be a metal that is harmless to the cell system such as copper, zinc, indium, bismuth and lead. Preferably, the collapsible member would be polystyrene, the gas would be air and the collapsible member would be secured to an anode current collector member. The anode current collector member can be made of brass and can be in the form of an elongated pin or nail or preferably in the form of an elongated arcuate member. In one preferred embodiment, the anode current collector member would be in the form of an elongated member having two or more longitudinal flanges and then the collector could be disposed within an elongated collapsible member in which the longitudinal flanges could keep the collapsible member expanded. The bottom of the collapsible member would be secured to the collector member and the top of the collapsible member would be open to a small confined space above the anode. The confined space into which the open end of the collapsible member is disposed could be at any location in the cell.

In the preferred embodiment of the invention, the separator forming the cavity for the anode has a height that is at least the height of the cathode electrode and the anode electrode in the cavity could extend up to at least 90% of the height of the cathode electrode and preferably to at least 95% of the height of the cathode electrode.

The electrochemical cells of this invention can comprise an alkaline electrolyte, a cathode and an anode arranged in a sealed container in a manner effective to provide electrochemical energy, i.e. when the cell is placed in a circuit, electrochemical energy is provided to the circuit. The cells have terminals of opposite polarity. One terminal is in contact with the cathode and the other is in contact with the anode. The cell is sealed in a manner effective to contain the cell components in the container under conditions of transport and use. The cell construction can include a cupped metallic can, suitably constructed of steel, nickel or other metal and can be nickel plated in whole or in part. A tubular cathode containing the active cathode material and conductor can be lined on the inner surface of the can, and a separator suitably made of a non-woven cellulosic or polymer fiber can be lined on the inner surface of the tubular cathode. In this construction, the can is in contact with the cathode and thus is the cathode terminal.

An anode made of a mixture of active anode material, electrolyte, optionally an electrolyte-swellable binder such as a polyacrylic acid can be enclosed within the separator. Preferably, an anode current collector member, such as in the form of a pin or arcuate shaped member along with a collapsible gas filled member are inserted into the anode. The cell is closed with a cover and sealed. The cover is in contact with the anode current collector member and is the anode terminal of the cell. Any conventional seal can be employed. It is desired that the cell construction not have a venting means that would vent due to the normal pressure generated in the cell during a normal discharge.

The electrolyte used in this invention is an aqueous alkaline solution, such as potassium hydroxide or sodium hydroxide. The concentration of the solution can be any concentration that provides for ionic conductivity. Typically, in the assembled cell the concentration preferably ranges from about 30% to about 40%.

The cathode used in this invention is comprised of a metal oxide as the active cathode component. Examples include manganese dioxide and silver oxide. Preferred is manganese dioxide, and more preferred is electrolytic manganese dioxide (EMD). EMD, a widely available commercial product, is prepared by plating manganese dioxide from a manganese sulphate plating solution onto an electrode. The deposited manganese dioxide is subsequently removed from the electrode and recovered.

In addition to the metal oxide, the cathode further comprises a compound that is electrically conductive. This compound is called a conductor and of the many types of known conductors, synthetic graphite is preferably used in the cells of this invention. Synthetic graphite is readily commercially available. One source is Lonza Ltd, a Swiss company. The cathode can further comprise a binder. Examples of suitable binders include polytetrafluoroethylene and polyethylene.

The cathodes comprise a major amount of the metal oxide, a conductive amount of the graphite and often an effective amount of binder. Typically, the metal oxide will comprise between about 80 to about 85 weight percent of the total cathode weight. When a binder is employed, the binder will comprise less than about 0.5% by weight. The remainder of the cathode will be comprised of graphite and electrolyte solution. The amount of the electrolyte solution is sufficient to wet the dry components, and to provide a mixture that can be molded. The cathodes are prepared by mixing the components together and dispensing the mix into the container. The mix is then molded or compressed against the inside of the container.

Zinc is used as the active anode material in the cells of this invention. Preferably, the zinc is low gassing zinc, and is in powder form. The powdered zinc is combined with a binder, optional components, and an amount of the electrolyte solution to form a gel. The anode gel generally expands when it is discharged.

DETAILED DESCRIPTION OF THE DRAWINGS

Figure 1:
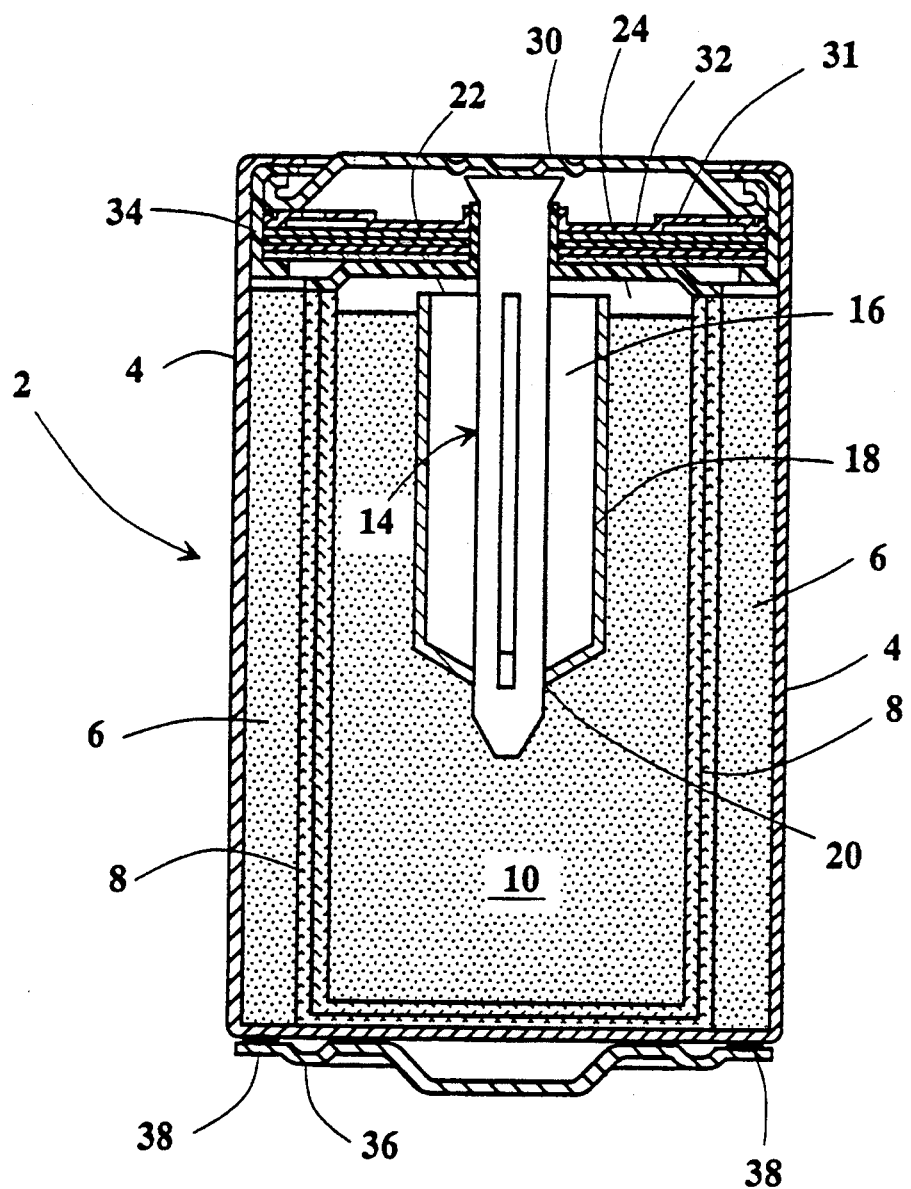
FIG. 1 is a cross-sectional view of an inverted alkaline cell of the present invention.

Referring to FIG. 1, the alkaline cell 2 is assembled in a conventional conductive steel container 4 which also forms an external terminal for the cell. The cathode 6 for cell 2 is porous manganese dioxide. A good source of highly porous manganese dioxide for use in air assisted cells is so-called chemically synthesized manganese dioxide or CMD. CMD is usually marketed with a porosity of 25% to 35%. However, CMD can be prepared in the form of very porous spheres having a porosity of approximately 60%. The porous spheres have a substantial amount of surface available for reaction with oxygen in the air-assisted cell. To increase the total energy capacity of an air-assisted cell in an air-free environment, substantially solid $MnO_2$ must be available for the cell reaction. A good source of substantially solid $MnO_2$ is electrolytically deposited $MnO_2$ or EMD. EMD can be obtained in the form of dense particles after the electrolytically deposited material is stripped from the electrodes, crushed and screened. EMD has a porosity of approximately 10%-16% and therefore is a substantially solid material. As the ratio of EMD to CMD increases, the cell's air-free capacity also increased. The amount of CMD and EMD used in the cathode of an air-assisted cell depends on the desired parameters of the cell with, for example, more or less CMD being used per cathode depending on the energy capacity desired in the presence of air. For a good cell capacity in an air-free environment and good rechargeability in an environment containing air, a mixture of 1:5, that is, one part by weight of CMD to five parts by weight of EMD is preferred.

After the cathode 6 is formed in the container 4 a separator 8 is added to physically isolate the anode material 10 from the cathode 6 and the container 4 while still permitting ion transport between the electrodes. The separator 8 could be made of two strips of separator material arranged perpendicular to one another and inserted into the cathode's tubular shape 6 forming a separator basket with a central opening. The anode mix 10 is then added to the separator lined cavity of the cell. The anode mix 10 for an air-assisted cell comprises a mixture of zinc powder, a surfactant such as Triton X-100 by Union Carbide Corp., a gel forming binder and a liquid electrolyte used in the cell. The preferred binder is Carbopol 940 which is a carboxy polymethylene polymer available from the B. F. Goodrich Company, of Cleveland, Ohio. The preferred electrolyte is an aqueous solution of potassium hydroxide. The alkaline electrolyte solution is approximately a 34% to 40% by weight solution of potassium hydroxide in water and is contained in the anode mix 10.

Figure 2:
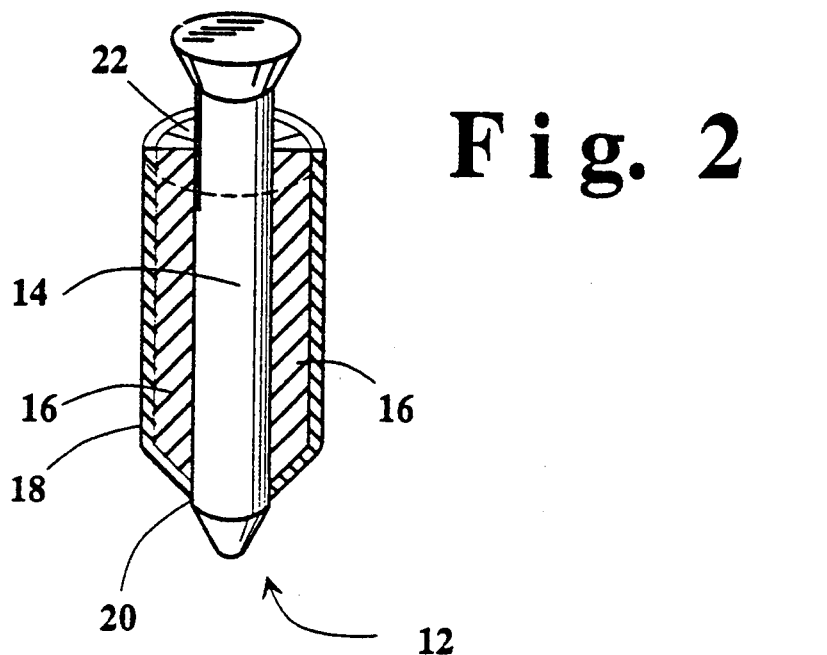
FIG. 2 is an isometric view of an anode current collector of this invention.

A subassembly 12 is shown in FIG. 2 comprising an anode current collector pin 14 which has three spaced-apart longitudinal flanges 16 and a gas filled collapsible member 18. The gas filled collapsible member 18 is secured to anode current collector pin 14 at the bottom segment 20 and at the opposite end 22 the gas filled collapsible member 18 is open. As shown in FIG. 1, the open end 22 of gas filled collapsible member 18 faces an open area 24 above anode 10 to receive the gas from the collapsible member when the member is collapsed by the expansion of the anode 10. The open area 24 could also accommodate some of the expansion of the anode 10.

A first terminal 30 is placed over an inner cover 31 and a multilayer film 32 which is comprised of four circular layers that are concentrically aligned with one another thereby forming a disc-shaped member which is secured to the cell with the first terminal 30 and inner cover 31 by gasket 34. The first terminal 30 makes electrical contact with pin 14 thus enabling the first terminal 30 to become a terminal for cell 2. The top cover or second terminal 36 can be fastened to the container 4 by welds 38 and thus the bottom cover becomes the second terminal of the cell 2.

Figure 3:
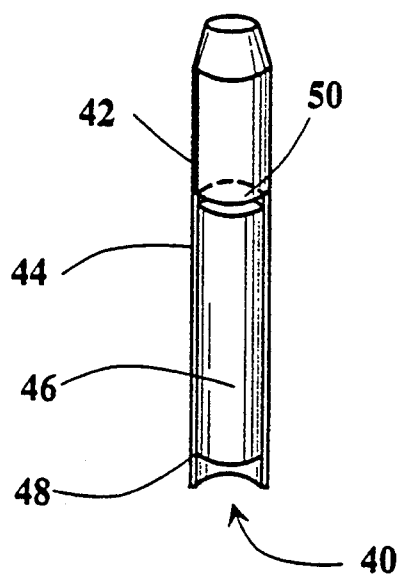
FIG. 3 is an isometric view of another anode current collector of this invention.

FIG. 3 shows another embodiment of the anode current collector 40 comprising a conductive pin 42 terminating with an elongated arcuate member 44 and disposed within the arcuate member 44 is a gas filled collapsible member 46. Again the gas filled collapsible member 46 would be secured at one end 48 to arcuate member 44 and open at the opposite end 50. The open end 50 would face open area 24 above anode 10 as shown in FIG. 1.

EXAMPLE

Several "C" size alkaline cells were made using a cathode mixture of electrolytic manganese dioxide, graphite, a binder and aqueous potassium hydroxide; a separator composed of two layers of a felted paper; and an anode gel comprising a mixture of aqueous potassium hydroxide, binder and powdered amalgamated alloyed zinc. All the cells were the same except that in half of the cells a gas filled collapsible member was secured to the anode current collector pin. The gas used was air and the collapsible member was made of polystyrene. The bottom of the gas filled collapsible member was secured to the anode current collector while the opposite end of the collapsible member was open and faced into an open area above the anode. The short circuit current was measured for each cell and then the cells were discharged across a 3.9 ohm load for 4 minutes per hour for 24 hours a day. The ampere hours (AH) to a selected cut-off voltage was measured and the data obtained are shown in the Table. The open circuit current for the cell without the collapsible member was 12.3 amperes while the cell with the collapsible member has an open circuit current of 16.9 amperes.

TABLE

| Cut-off voltage (voltage) | Sample without collapsible member (ampere-hours) | Sample with collapsible member (ampere-hours) | Gain |
| --- | --- | --- | --- |
| 1.20 | 2.4 | 3.0 | 25% |
| 1.10 | 4.1 | 4.6 | 12% |
| 1.0 | 4.7 | 5.10 | 9% |
| 0.9 | 5.1 | 5.45 | 7% |
| 0.75 | 5.5 | 6.0 | 9% |
| 0.55 | 5.9 | 7.5 | 27% |

As shown from the data, the cells with the collapsible member provided an increase in output capacity over identical cells but without the collapsible member.

Though the invention has been described with respect to preferred embodiments thereof, many variations and modifications will become apparent to those skilled in the art. It is therefore the intention that the appended claims be interpreted as broadly as possible in view of the prior art to include all such variations and modifications.

I claim:

1. A galvanic cell comprising a conductive container; a cathode electrode in electronic contact with the container and said container functioning as the first terminal of the cell; a separator disposed within said cathode electrode to form a cavity within said cathode electrode, said separator permitting ion transport; an anode electrode disposed within said cavity and electronically insulated from the cathode electrode by said separator; an anode current collector in electronic contact with said anode electrode and in electronic contact to an external terminal of the cell in which said external terminal functions as the second terminal of the cell; and said anode current collector comprises a gas filled collapsible member disposed within said anode electrode and having an opening into a confined space in the cell and said gas filled collapsible member adapted to accommodate expansion of the anode electrode.

2. The galvanic cell of claim 1 wherein the anode current collector comprises a conductive member in electronic contact with the anode electrode and a gas filled collapsible member embedded in said anode electrode to accommodate expansion of the anode electrode.

3. The galvanic cell of claim 2 wherein the gas filled collapsible member is a conductive member.

4. The galvanic cell of claim 2 wherein the gas filled collapsible member comprises a nonconductive substrate at least partially coated with a conductive layer.

5. The galvanic cell of claim 4 wherein the gas filled collapsible member contains air.

6. The galvanic cell of claim 4 wherein the gas filled collapsible member contains nitrogen.

7. The galvanic cell of claim 1 wherein the anode electrode fills at least 80% of the cavity defined by the separator.

8. The galvanic cell of claim 1 wherein the separator forming the cavity has a height that is at least the height of the cathode electrode and wherein the anode electrode in the cavity extends up to at least 90 percent of the height of the cathode electrode.

9. The galvanic cell of claim 8 wherein the separator forming the cavity has a height that is at least the height of the cathode electrode and wherein the anode electrode in the cavity extends up to at least 95% of the height of the cathode electrode.

10. The galvanic cell of claim 2 wherein the gas filled collapsible member is a gas-filled elongated plastic member.

11. The galvanic cell of claim 10 wherein the gas filled collapsible member is secured to the conductive member.

12. The galvanic cell of claim 10 wherein the separator forming the cavity has a height that is at least the height of the cathode electrode and the anode electrode in the cavity extends up to at least 90 percent of the height of the cathode electrode.

13. The galvanic cell of claim 10 wherein the separator forming the cavity has a height that is at least the height of the cathode electrode and the anode electrode in the cavity extends up to at least 95% of the height of the cathode electrode.

14. The galvanic cell of claim 10 wherein the gas is air.

15. The galvanic cell of claim 11 wherein the gas is nitrogen.

16. The galvanic cell of claim 1 wherein the cathode electrode comprises manganese dioxide.

17. The galvanic cell of claim 1 wherein the anode electrode comprises zinc, a binder and an electrolyte.

18. The galvanic cell of claim 17 wherein the cathode electrode comprises manganese dioxide.

* * * * *